United States Patent
Lamborn et al.

(10) Patent No.: US 8,267,661 B2
(45) Date of Patent: Sep. 18, 2012

(54) ROTOR BALANCE DEVICE AND METHOD

(75) Inventors: Lyndon Lamborn, Mesa, AZ (US); Neal Muylaert, Apache Junction, AZ (US)

(73) Assignee: The Boeing Company, Chicago, IL (US)

( * ) Notice: Subject to any disclaimer, the term of this patent is extended or adjusted under 35 U.S.C. 154(b) by 1275 days.

(21) Appl. No.: 12/018,596

(22) Filed: Jan. 23, 2008

(65) Prior Publication Data

US 2009/0169383 A1    Jul. 2, 2009

Related U.S. Application Data

(60) Provisional application No. 61/018,014, filed on Dec. 31, 2007.

(51) Int. Cl.
*B64C 27/46* (2006.01)

(52) U.S. Cl. ........................................ 416/144; 415/119

(58) Field of Classification Search .................. 415/119; 416/144, 145, 204 R, 205, 207–209, 220 A, 416/214 R, 134 A, 134 R, 139; 29/407.01, 407.05, 407.08, 407.09, 407.1

See application file for complete search history.

(56) References Cited

U.S. PATENT DOCUMENTS

| | | | | |
|---|---|---|---|---|
| 2,375,326 A | * | 5/1945 | Roche et al. | 416/209 |
| 2,708,483 A | * | 5/1955 | Camping et al. | 416/144 |
| 2,715,446 A | * | 8/1955 | Felt | 416/145 |
| 3,237,697 A | * | 3/1966 | Ford et al. | 416/226 |
| 4,407,635 A | * | 10/1983 | Grimes et al. | 416/230 |
| 7,040,863 B2 | * | 5/2006 | Guimbal | 416/134 A |

* cited by examiner

*Primary Examiner* — Edward Look
*Assistant Examiner* — Jesse Prager

(57) ABSTRACT

A rotor balance fitting to balance an aircraft rotor includes a ring, bore, and cup. The ring includes an inner surface configured to mate with an outer surface of a blade for the aircraft rotor. The bore is disposed through the ring and configured to receive a blade pin that passes perpendicularly through an axis of the blade and secures the blade to the rotor. The cup is disposed in the ring and is configured to secure a weight.

20 Claims, 3 Drawing Sheets

ROTOR BALANCE DEVICE AND METHOD

CROSS REFERENCE TO RELATED APPLICATIONS

This application claims priority to U.S. Provisional Application Ser. No. 61/018,014, filed on Dec. 31, 2007, titled "ROTOR BALANCE DEVICE AND METHOD," the disclosure of which is incorporated herein by reference in its entirety.

FIELD OF THE INVENTION

The present disclosure generally relates to aircraft rotor balancing. More particularly, the present disclosure pertains to a device to balance aircraft rotor blades and a method of using the device to balance aircraft rotor blades.

BACKGROUND

It is generally known that aircraft rotors are balanced to reduce vibration in the spinning rotors. Examples of such rotors include the main rotor and tail rotor assembly of helicopters and other such rotor assemblies. These rotors generally include two or more blades that are spun to generate lift. If the rotor assembly is not balanced, centripetal force generated by the spinning assembly will amplify any imbalance and cause unwanted vibration. To balance rotors and therefore reduce or prevent vibration, conventional rotors typically have weights affixed near or on the tip of the blades. In conventional blades, small holes or pockets may be formed near the blade tip to accept weighted inserts. These pockets are then covered to reduce drag across the airfoil shaped blade.

However, in blades without these pockets, there is no acceptable conventional way to permanently affix weights to the blades without creating drag or compromising the integrity of the blade. Accordingly, it is desirable to provide a rotor balancing device and method of balancing rotors that is capable of overcoming the disadvantages described herein at least to some extent.

SUMMARY

The foregoing needs are met, to a great extent, by embodiments the present disclosure, wherein in one respect a rotor balancing device and method of balancing rotors is provided that in some embodiments facilitates joining dissimilar materials together.

An embodiment relates to a rotor balance fitting to balance an aircraft rotor. The balance fitting includes a ring, bore, and cup. The ring includes an inner surface configured to mate with an outer surface of a blade for the aircraft rotor. The bore is disposed through the ring and configured to receive a blade pin that passes perpendicularly through an axis of the blade and secures the blade to the rotor. The cup is disposed in the ring and is configured to secure a weight.

Another embodiment pertains to a method of balancing an aircraft rotor. In this method, a ring is secured to a blade of the rotor with a blade pin at a junction between the blade and a hub of the rotor, a weight sufficient to balance the rotor is disposed in a cup of the ring, and the weight is fastened in the cup.

There has thus been outlined, rather broadly, certain embodiments of the disclosure in order that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that the disclosure is not limited in its application to the details of construction and to the arrangements of the components set forth in the following description or illustrated in the drawings. The disclosed device and method is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various embodiments. It is important, therefore, that the claims be regarded as including such equivalent constructions insofar as they do not depart from the spirit and scope of the various embodiments.

DETAILED DESCRIPTION OF THE PREFERRED EMBODIMENT

Figure 1:
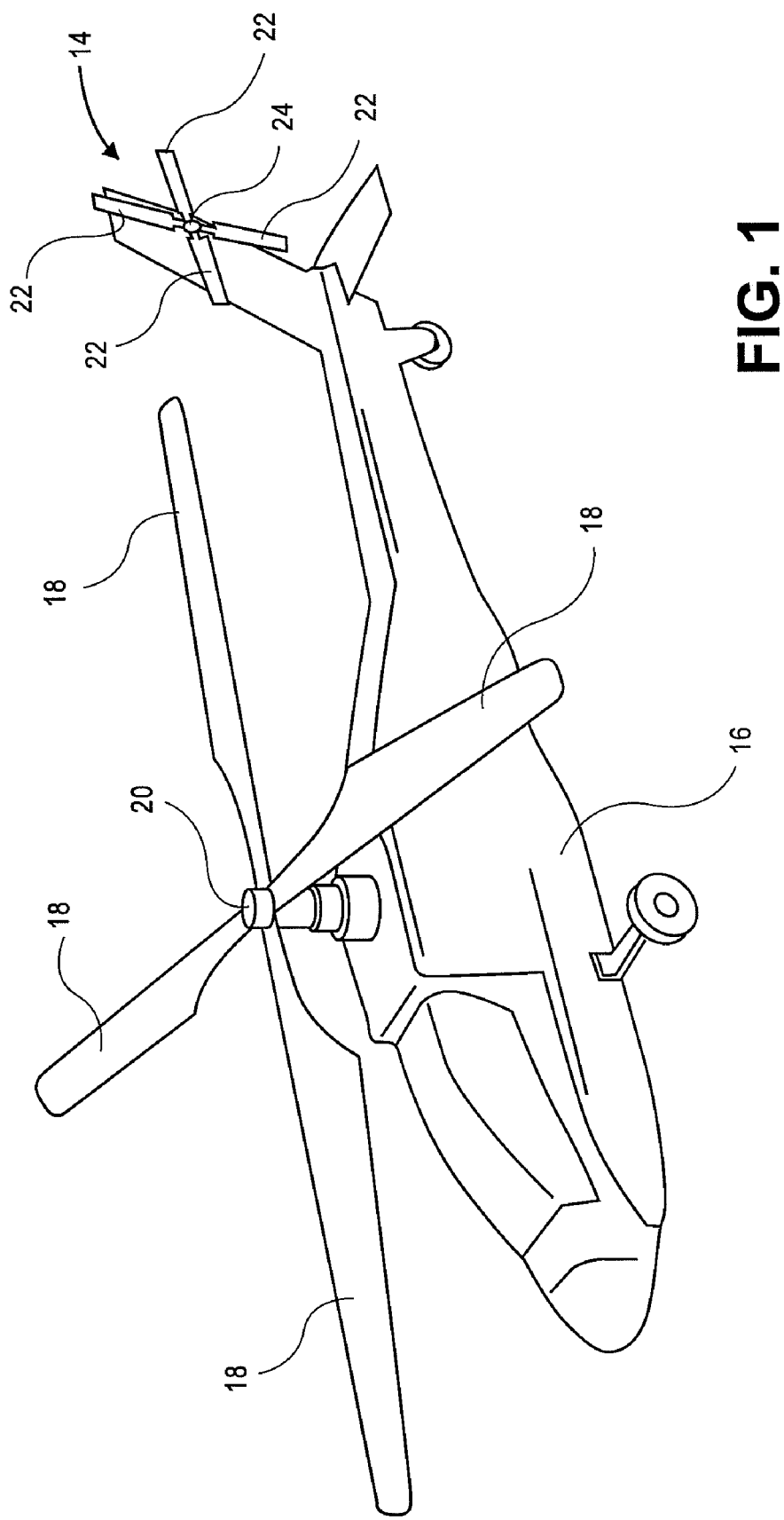
FIG. 1 is a perspective view of an aircraft suitable for use with an embodiment.

An embodiment will now be described with reference to the drawing figures, in which like reference numerals refer to like parts throughout. FIG. 1 is a perspective view of an aircraft 10 suitable for use with an embodiment. As shown in FIG. 1, the aircraft 10 includes a main rotor assembly 12, a tail rotor assembly 14, and a fuselage 16. The main rotor assembly 12 includes a plurality of blades 18 that are attached to and rotate about a hub 20. Similarly, the tail rotor assembly 14 includes a plurality of blades 22 that rotate about a hub 24.

As is generally known, the main rotor assembly 12 operates to provide lift to the aircraft 10 and the tail rotor assembly 14 operates to offset the torque generated by the spinning main rotor assembly 12 and generally provide yaw control for the aircraft 10. Despite these differences, these and other rotor assemblies share many similarities. In the following description, a particular example is made of the tail rotor assembly 14. However, it is to be noted that embodiments are not limited to tail rotor assemblies, but rather, may be utilized with any suitable rotor or other such rotating device.

Figure 2:
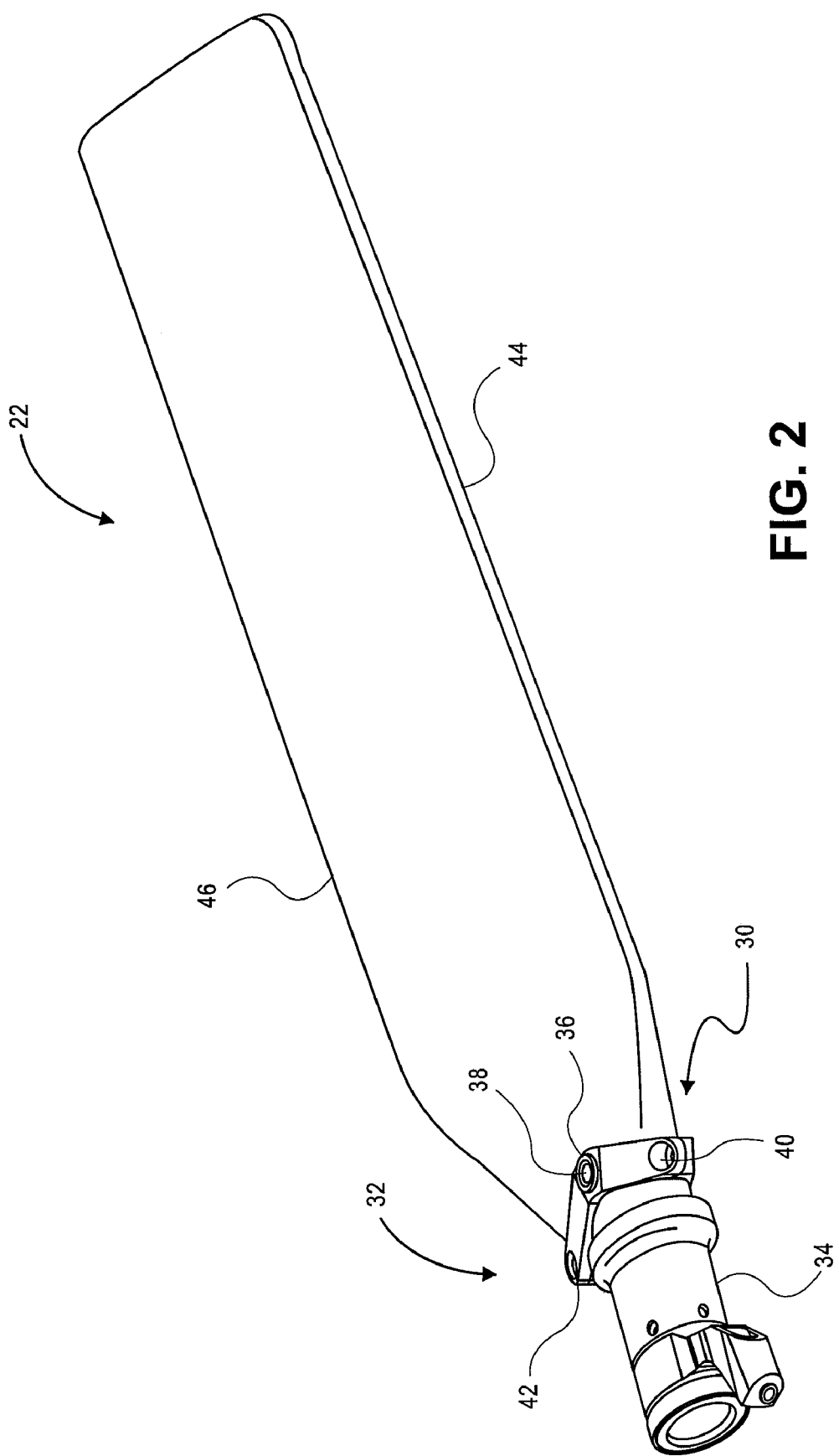
FIG. 2 is a perspective view of a rotor blade and balance device according to an embodiment.

FIG. 2 is a perspective view of a rotor blade 22 and a balance fitting or balance device 30 according to an embodiment. As shown in FIG. 2, the balance device 30 is disposed upon the blade 22 at a taper 32 or region of the blade that tapers. More particularly, the balance device 30 is disposed at a junction between the blade 22 and a shaft 34. The shaft 34, in its turn, is secured to the hub 24. It is an advantage of this embodiment that the balance device 30 is captured geometrically by the placement at a relatively narrow region of the taper 32.

Figure 3:
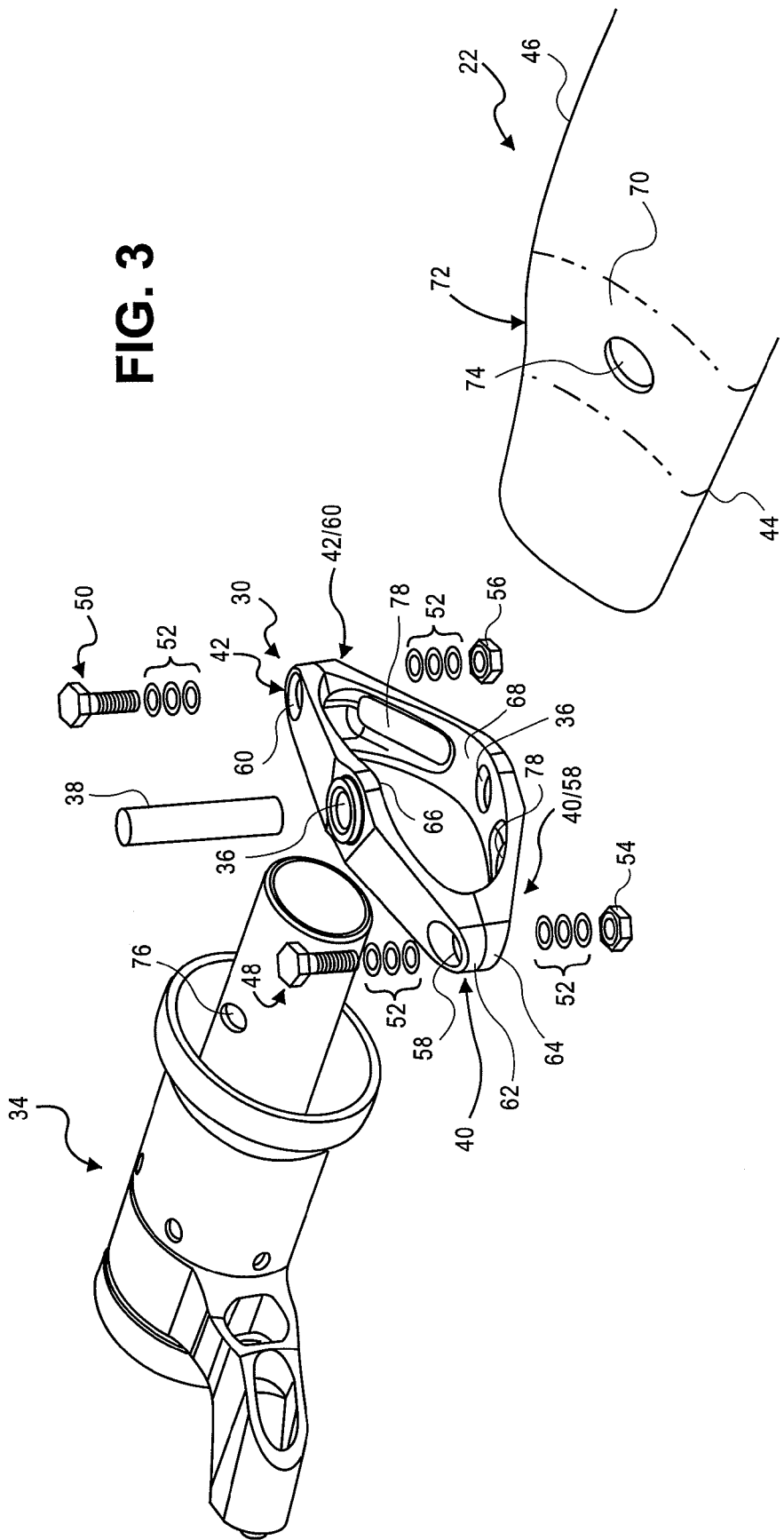
FIG. 3 is an exploded view of the balance device in accordance with an embodiment.

In addition, the balance device 30 includes a central hole or bore 36. The bore is configured to receive a retaining pin 38. While not explicitly shown in FIG. 2, the retaining pin 38 is shown in FIG. 3 and is utilized to secure the balance device 30, blade 22 and shaft 34 by passing through a hole therethrough. Furthermore, as described herein, the balance device 30 may be affixed to the blade 22 with an adhesive. Thus, the balance device 30 may be secured to the blade 22 in a triple redundant manner.

Also shown in FIG. 2, the balance device 30 includes a weight cup 40 and 42. The weight cup 40 is disposed at or near a leading edge 44 of the blade 22 and the weight cup 42 is disposed at or near a trailing edge 46 of the blade 22. By placing weights having an appropriate mass in the weight cups 40 and 42, the blade 22 may be axially balanced. As such, the balance device 30 facilitates both span wise and chord wise balancing of the rotor 14. It is another advantage of the balance device 30 that the positional relationship of the balancing device 30 and blade 22 is retained even as the pitch of the blade 22 is adjusted and thus, the blade 22 remains axially balanced during operation.

By locating the balance device 30 relatively close to the hub 24, the balance device 30 is subject to greatly reduced wind velocity. As such, any drag generated by the balance device 30 is correspondingly reduced.

FIG. 3 is an exploded view of the balance device 30 in accordance with an embodiment. The balance device may include any suitable material. Examples of suitable materials include aluminum and aluminum alloys, magnesium and magnesium alloys, other metals, resins, plastics, composites, and the like. As shown in FIG. 3 the balance device 30 includes a plurality of fasteners 48 and 50 configured to reside in weight cups 40 and 42 respectively. The fasteners 48 and 50 are configured to retain a plurality of weights 52. The weights 52 may include any suitably sized and shaped material. In general, the weights 52 may include a variety of masses and/or may include a variety of materials having different densities. More particularly, the weights 52 may include an assortment of weights made of steel, aluminum, nylon, and the like. By utilizing higher density weights, the mass in the weight cup 40 may be increased relative to the mass in weight cup 42 or vise versa. It is an advantage of this embodiment that "off the shelf" washers of steel, aluminum, and nylon, may be utilized as the weights 52. To retain the fasteners 48 and 50 and secure the weights 52 in the weight cups 40 and 42, respective nuts 54 and 56 may be threadedly attached to the fasteners 48 and 50. In addition, the weight cups 40 and 42 may include bearing surfaces 58 and 60. The fasteners 48 and 50, weights 52, and/or nuts 54 and 56 may bear upon the bearing surfaces 58 and 60 to secure the weights 52 in the weight cups 40 and 42.

According to various embodiments, the balance device 30 may be essentially a unitary ring or may include two or more segments or arms. In a particular embodiment, the balance device 30 includes a pair of arms 62 and 64. The arms 62 and 64 may, according to various embodiments, be identical, mirror images, or different from one another. In a preferred example, the arm 62 is configured to follow the contour of one side of the blade 22 and the arm 64 is configured to follow the contour of the opposite side of the blade 22. To join the arms 62 and 64, the arm 64 may also include the weight cups 40 and 42 and the bearing surfaces 58 and 60. As such, the fasteners 48 and 50 and the respective nuts 54 and 56 may facilitate fastening the arms 62 and 64 as well as securing the weights 52 in the weight cups 40 and 42.

The balance device 30 further includes an inner surface 66 and 68 configured to mate with respective outer surfaces 70 and 72 of the blade 22. These inner surfaces 66 and 68 and outer surfaces 70 and 72 may also serve as bonding surfaces. As such, the surfaces 66 to 72 may be configured to receive an adhesive to affix the balancing device 30 to the blade 22. For example, the surfaces 66 to 72 may be cleaned, degreased, chemically or physically etched or coated with a priming layer to facilitate adhesion.

Also shown in FIG. 3, the blade 22 and shaft 34 include respective bores 74 and 76. The bores 36, 74, and 76 are configured to be aligned and to receive the retaining pin 38. Thus assembled, the retaining pin 38 secures the components together.

To reduce the mass of the balancing device 30, one or more pockets 78 may be milled, cast, or otherwise formed in the balancing device 30. In a particular example, the pockets 78 are milled into the inner surfaces 66 and 68.

The many features and advantages of the various embodiments are apparent from the detailed specification, and thus, it is intended by the appended claims to cover all such features and advantages that fall within the true spirit and scope of the embodiments. Further, since numerous modifications and variations will readily occur to those skilled in the art, it is not desired to limit the embodiments to the exact construction and operation illustrated and described, and accordingly, all suitable modifications and equivalents may be resorted to, falling within the scope of the various embodiments.

What is claimed is:

1. A rotor balance fitting to balance an aircraft rotor, the balance fitting comprising:
   ring having an inner surface configured to mate with a blade of the aircraft rotor;
   a bore disposed through the ring, the bore configured to receive a blade pin, the blade pin passing perpendicularly through an axis of the blade and securing the blade to the rotor; and
   a cup disposed in the ring and being open to an exterior of the ring, the cup being configured to secure a weight.

2. The rotor balance fitting according to claim 1, further comprising:
   a first arm; and
   a second arm, wherein the first arm and second arm are fastened together to generate the ring.

3. The rotor balance fitting according to claim 2, further comprising:
   an inner surface of the first arm being configured to mate with an upper side of the outer surface; and
   an inner surface of the second arm being configured to mate with a lower side of the outer surface.

4. The rotor balance fitting according to claim 1, further comprising:
   an opposing cup disposed in the ring and being substantially diametrically opposed from the cup, wherein the cup and the opposing cup are configured to axially balance the blade.

5. The rotor balance fitting according to claim 1, wherein the inner surface is configured to mate with a portion of the blade that tapers towards the axis and wherein the ring is captured geometrically due to the taper.

6. The rotor balance fitting according to claim 1, further comprising:
   a pocket disposed on the inner surface to reduce the weight of the ring.

7. The rotor balance fitting according to claim 1, further comprising:
   a bonding surface coinciding with the inner surface, the bonding surface being configured to receive an adhesive to affix the rotor balance fitting to the blade.

8. The rotor balance fitting according to claim 1, further comprising:
   a fastener to secure the weight in the cup.

9. The rotor balance fitting according to claim 1, further comprising:
a plurality of weights operable to be secured in the cup, wherein an amount of weight in the cup is adjusted by varying a number of weights in the cup.

10. The rotor balance fitting according to claim 9, wherein the plurality of weights includes a subset of weights having a different mass than another subset of weights.

11. A method of balancing an aircraft rotor, the method comprising:
securing a ring to a blade of the rotor, the ring being secured with a blade pin at a junction between the blade and a hub of the rotor;
disposing a weight in a cup open to an exterior of the ring, the weight being sufficient to balance the rotor; and
fastening the weight in the cup.

12. The method according to claim 11, further comprising:
fastening a first arm and a second arm together to generate the ring.

13. The method according to claim 12, further comprising:
mating an inner surface of the first arm with an upper side of the blade; and
mating an inner surface of the second arm with a lower side of the blade.

14. The method according to claim 11, further comprising:
axially balancing the blade by disposing the weight having a sufficient mass in an opposing cup disposed in the ring and being substantially diametrically opposed from the cup.

15. The method according to claim 11, further comprising:
geometrically capturing the ring around the blade by disposing the ring around a tapered portion of the blade.

16. The method according to claim 11, further comprising:
reducing the mass of the ring by disposing a pocket on an inner surface of the ring.

17. The method according to claim 11, further comprising:
bonding an inner surface of the ring to an outer surface of the blade, the inner surface being configured to receive an adhesive.

18. The method according to claim 11, further comprising:
securing the weight in the cup with a fastener.

19. The method according to claim 11, further comprising:
adjusting an amount of mass in the cup by varying a number of weights in the cup.

20. The method according to claim 11, further comprising:
adjusting an amount of mass in the cup by disposing a weight having a different mass in the cup.

* * * * *